Oct. 31, 1950 T. W. SMALL 2,527,586

RECORD CHANGING MECHANISM FOR PHONOGRAPHS

Original Filed Oct. 5, 1939 4 Sheets-Sheet 1

INVENTOR
THOMAS W. SMALL
DECEASED
BY ANNA SMALL KOEHLINGER
EXECUTRIX

BY Lockwood, Goldsmith & Galt
ATTORNEYS.

RECORD CHANGING MECHANISM FOR PHONOGRAPHS

Original Filed Oct. 5, 1939 4 Sheets-Sheet 2

INVENTOR
THOMAS W. SMALL,
DECEASED
BY ANNA SMALL KOEHLINGER,
EXECUTRIX
BY Lockwood, Goldsmith & Galt
ATTORNEYS.

Oct. 31, 1950 T. W. SMALL 2,527,586

RECORD CHANGING MECHANISM FOR PHONOGRAPHS

Original Filed Oct. 5, 1939 4 Sheets-Sheet 3

INVENTOR

THOMAS W. SMALL,
BY DECEASED
ANNA SMALL KOEHLINGER,
EXECUTRIX.

BY Lockwood, Goldsmith & Galt
ATTORNEYS.

RECORD CHANGING MECHANISM FOR PHONOGRAPHS
Original Filed Oct. 5, 1939 4 Sheets-Sheet 4
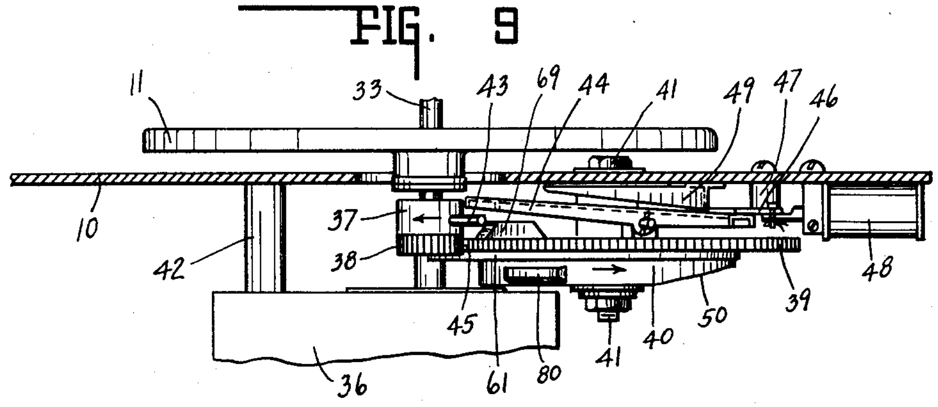
FIG. 10 FIG. 11 FIG. 12 FIG. 13
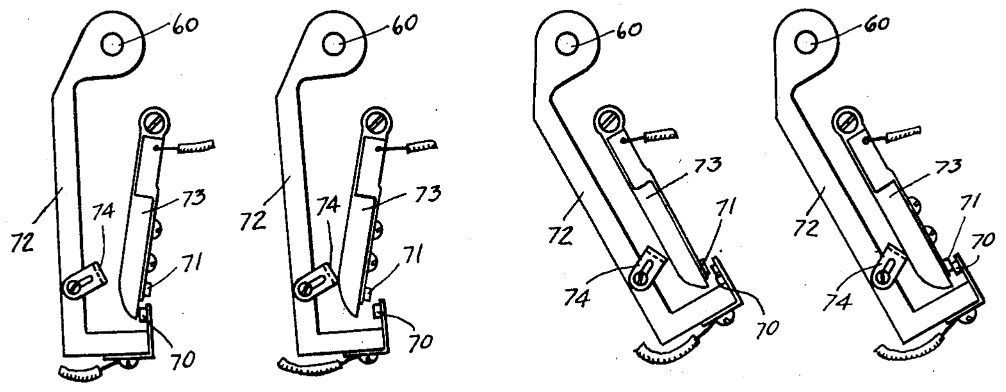
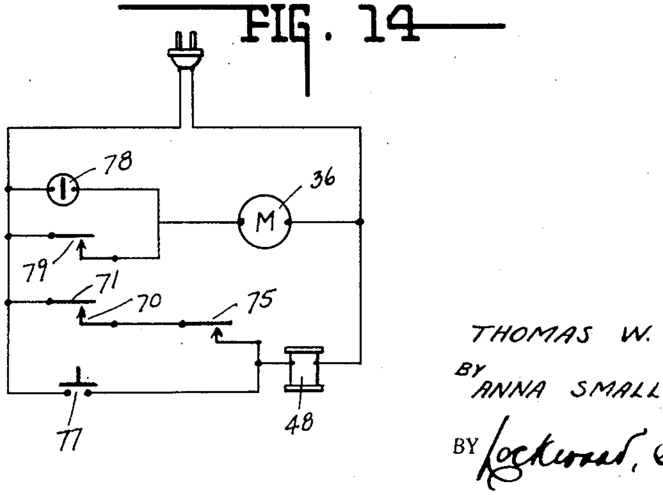
INVENTOR
THOMAS W. SMALL.
DECEASED
BY ANNA SMALL KOEHLINGER
EXICUTRIX
BY Lockwood, Goldsmith & Galt
ATTORNEYS.

Patented Oct. 31, 1950 2,527,586

UNITED STATES PATENT OFFICE 2,527,586

RECORD CHANGING MECHANISM FOR PHONOGRAPHS

Thomas W. Small, deceased, late of Fort Wayne, Ind., by Anna Small Koehlinger, executrix, Fort Wayne, Ind., assignor, by mesne assignments, to Farnsworth Research Corporation, a corporation of Indiana Original application October 5, 1939, Serial No. 298,092. Divided and this application June 26, 1944, Serial No. 542,102

15 Claims. (Cl. 274—10)

This invention relates to an automatic record changer for disk record phonographs wherein the stack of records is supported above the turntable, the lowermost record of the stack being released to drop by gravity upon the turntable for reproduction, being a division of application for Letters Patent, Serial No. 298,092, filed October 5, 1939, for "Record Changing Mechanism for Phonographs," Patent No. 2,371,361, granted March 13, 1945.

The principal object of the invention is to enable a selective record changing mechanism to be produced with a minimum of working parts so as to be capable of economical production and take up little space in the phonograph. Thus, the invention is primarily directed toward improving upon record changers of this type in the direction of simplified mechanism.

This invention, for illustration, is shown as applied to a mechanism for releasing the lowermost record while supporting the superimposed records. This is accomplished by an extension of the centering pin so as to provide an eccentric portion, coupled with means for lowering one of the supports to permit the center hole of the lowermost record to be engaged by the eccentric portion, which, in its rotary movement, will shift the record laterally to release its opposite supported sides alternately.

This invention is primarily directed to the structure for actuating the record changing mechanism through its cycle of movement following completion of the playing of one record to replace it with another record to be played. This is accomplished by associating a mutilated cam gear with a driving pinion continuously rotatable with the turntable, so arranged that during playing of a record the pinion and mutilated portion of the cam gear are in registry. At the completion of the record, through the action of the reproducer, a coupling between the drive and cam gear is brought into play to shift the cam gear into driving engagement with the pinion, whereupon it will be rotated through one revolution to effect the change of records and then come to rest upon its mutilated portion registering again with the drive pinion.

A further feature of the invention resides in a new and novel trip mechanism for initiating the record changing cycle upon the reproducer moving inward with a spiral groove or oscillating by engagement with an eccentric groove. This is accomplished by a pair of interacting contacts for closing a circuit through a tripping solenoid, one of said contacts being mounted on the end of a hook movable with the tone arm while the other contact is on a freely moving pivoted arm carried within the hook. Thus, when the tone arm is moved inwardly by a spiral groove, it engages the arm and moves it into contact with the end of the hook. When the tone arm is given a reverse movement by an eccentric groove, it moves the hooked end thereof backwards to engage the contact on the arm.

The full nature of the invention will be understood from the accompanying drawings and the following description and claims:

Fig. 9 is a side elevation, partially in section, of portions of the actuating mechanism during the playing of a record.

Fig. 10 is a view of the record trip arms when in record changing position.

Fig. 11 is the same as Fig. 10 in record playing position.

Fig. 12 is the same as Fig. 11 upon reverse movement of the tone arm by an eccentric record groove.

Fig. 13 shows the position of the arms when actuated by a spiral lead-in groove in the record.

Fig. 14 is a wiring diagram showing the circuits and switches.

Figures 1, 2:
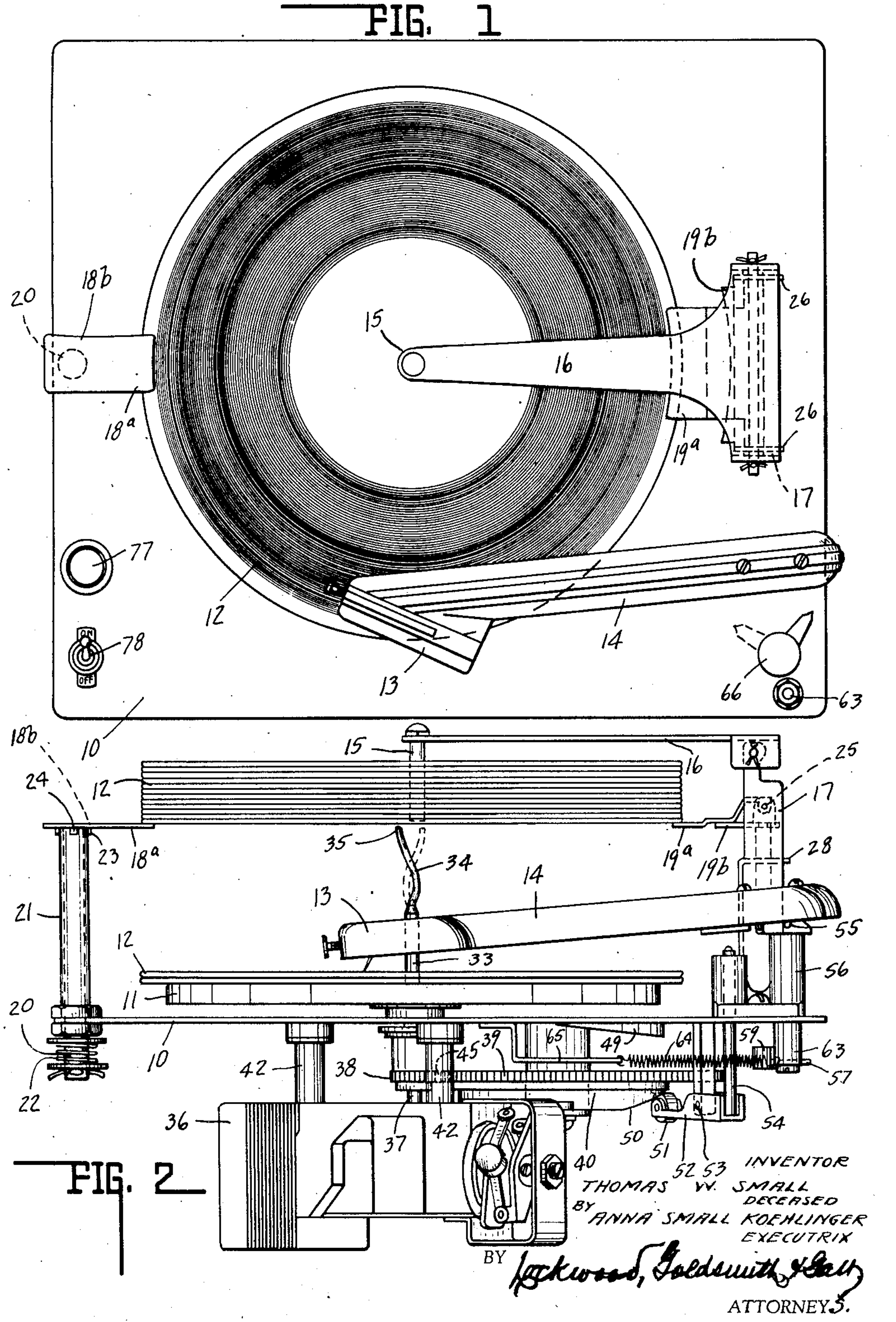
Fig. 1 is a plan view of the record changer with the unplayed records removed.
Fig. 2 is a side elevation thereof showing a group of records supported over the turntable, and on the turntable in playing position.

In the drawings there is shown a record changing and reproducing mechanism including a base plate 10 supporting a horizontally rotatable turntable 11 carrying one or more records 12 thereon, the uppermost record of the group carried by the turntable being positioned for reproduction. The unplayed records 12 are supported in a stack or group immediately above the turntable and spaced therefrom in position for release of the lowermost record for permitting it to drop by gravity into playing position on the turntable. Associated with the turntable there is the usual reproducer 13 mounted on the end of the tone arm 14.

The unplayed records 12 are centered in stacked formation above the turntable by an overhead centering pin 15 carried by a swinging arm 16 pivoted at its supported end upon an upright standard 17 extending upwardly from the base plate 10.

Figure 5:
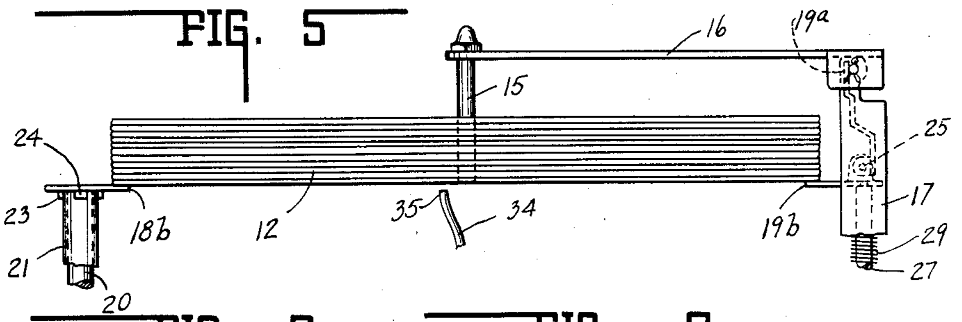
Fig. 5 is a partial view showing a side elevation of the record supports for twelve inch records.

With the unplayed group of records 12 positioned by the pin 15, their opposed peripheral edges are supported by the plates 18*a* and 19*a*, provided said records are of the ten inch size. If said records are of the twelve inch size, they are supported by the plates 18*b* and 19*b*, as illustrated in Fig. 5.

The plates 18*a* and 18*b* are integral, being rotatably supported at the proper height upon a post 20 slidable and rotatable within a tubular standard 21, said standard being supported upon the base plate 10. The post 20, being both slidably and rotatably mounted in the standard, is held in its lower position by a spring 22 and is provided with oppositely-extending lugs 23 at its upper end which are seatable in the notches 24 of the standard. Thus, said supporting plates may be turned to any desired 90 degrees angle and locked in position. When positioned to support ten inch records, said plates are rotated and locked in the position shown in Figs. 1 and 2. When supporting twelve inch records, said plates are rotated 90 degrees and locked in the opposite position as shown in Fig. 5.

The plates 19*a* and 19*b* are correspondingly adjustable for accommodating either size of records. For this purpose the plate 19*a* is horizontally pivoted between the uprights of standard 17 upon a horizontally extending rod 25 supported by the brackets 26 carried by the shafts 27. Thus, supporting plate 19*a* may be swung to a lower position for supporting ten inch records, as in Figs. 1 and 2, or swung upwardly to a vertical position out of the way, so as to expose the plate 19*b* which is positioned for supporting twelve inch records, as shown in Fig. 5. Plate 19*b* is supported directly upon the shafts 27 which are slidable with and guided by a cross head 28 within the standard 17. Said shafts with the supporting plates carried thereby are normally maintained in uppermost position under tension of the springs 29, in which position they support the unplayed records free of the record releasing member, as hereinafter described.

Figures 3, 4:
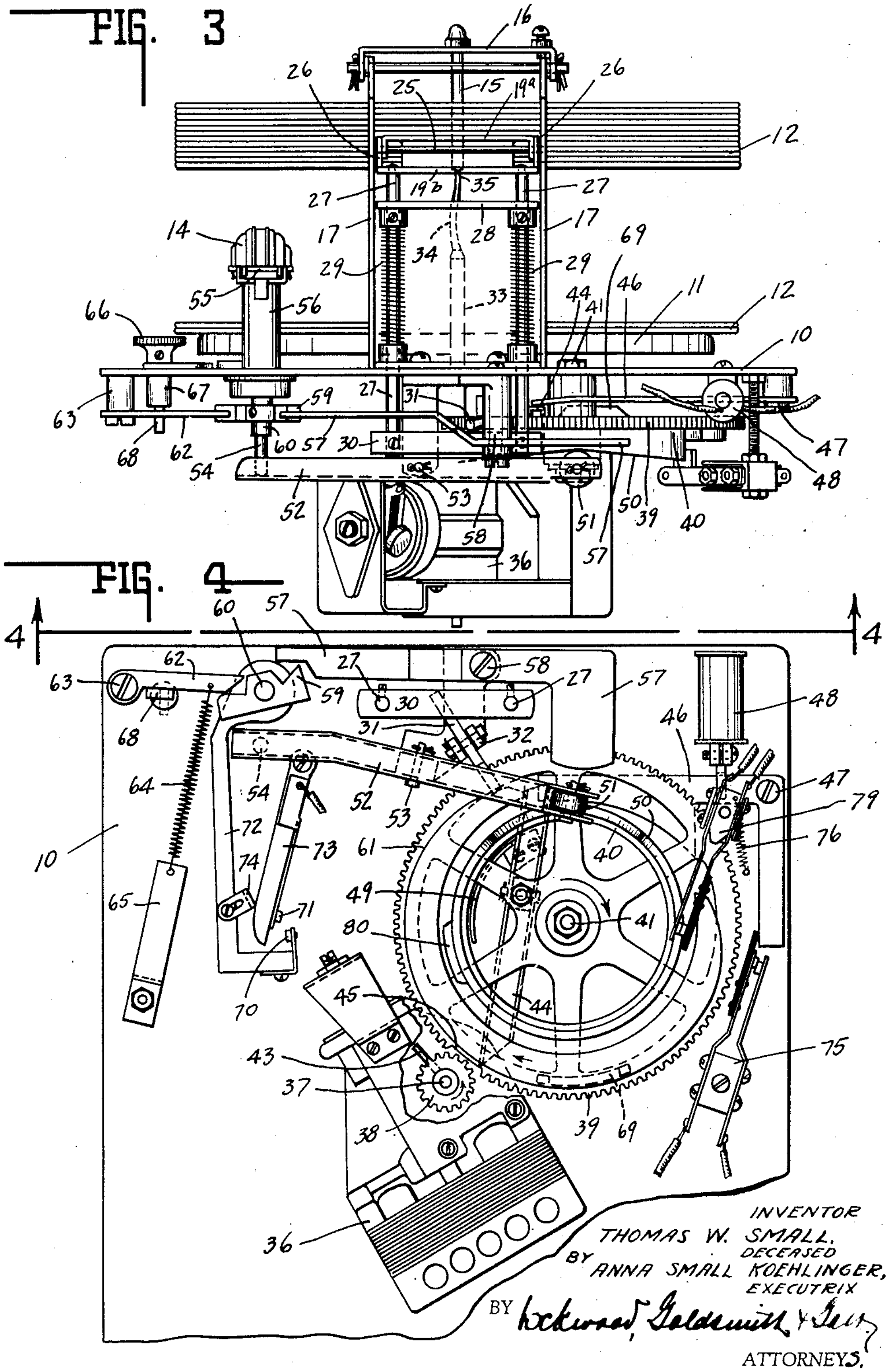
Fig. 3 is a rear elevation of the record changer.
Fig. 4 is a bottom plan view showing the underside thereof.

The lower ends of said shafts 27 slidably extend through the base plate 10 and have their lower ends connected below said plate to a cross bar 30 which has its upper surface engaged by one end of a pivoted lever 31 (Figs. 3 and 4). Said lever is pivotally supported by a suitable bracket 32 depending from the underside of the base plate 10. The opposite end of said lever is positioned to be engaged and actuated by the master cam, as hereinafter described, for pressing the bar 30 downwardly against the tension of springs 29 to lower the supporting plates 19*a* and 19*b* when the bottom record is to be released.

The centering pin portion 33 of the turntable is horizontally displaced (Fig. 2) to the left of pin 15 and extends upwardly in the usual cylindrical form to the height at which the played records may accumulate upon the turntable. However, said pin is prolonged in curved formation to provide a hook-like camming portion 34 terminating in a head 35 the vertical axis of which is horizontally displaced with respect to that of portion 33. As illustrated in Fig. 2, head 35 lies to one side of and immediately below the periphery of the overhead centering pin 15. Thus, the head 35 rotates with the turntable through a circular path transverse of the center hole of the lowermost unplayed record and eccentrically of the axial center of pin 15.

The unplayed records 12 are normally carried by their supporting plates in a plane above the head 35 so as not to be engaged thereby. But when the plates 19*a*, 19*b* are lowered by the action of the lever 31, the lowermost record of the group drops to a position where its center hole is engaged by the head 35. The eccentric movement of said head engaging with the record will slide it first to the left (Fig. 2), so that its right-hand edge will disengage the supporting plates 19*a* or 19*b*. Its left-hand edge will still be supported by the plates 18*a* or 18*b* until the right-hand side drops down on the more extensively curved camming portion 34 which will act to throw the record to the right for disengaging its left-hand edge from said last-mentioned plates. The record then continues to oscillate by its engagement with the curved portion 34 and to move downwardly, but restrained by the friction resulting from the said curved portion, until it reaches the centering pin portion 33, whereupon said record will be properly centered in playing position. This movement is diagrammatically illustrated in Figs. 6 and 7.

Figures 6, 7, 8:
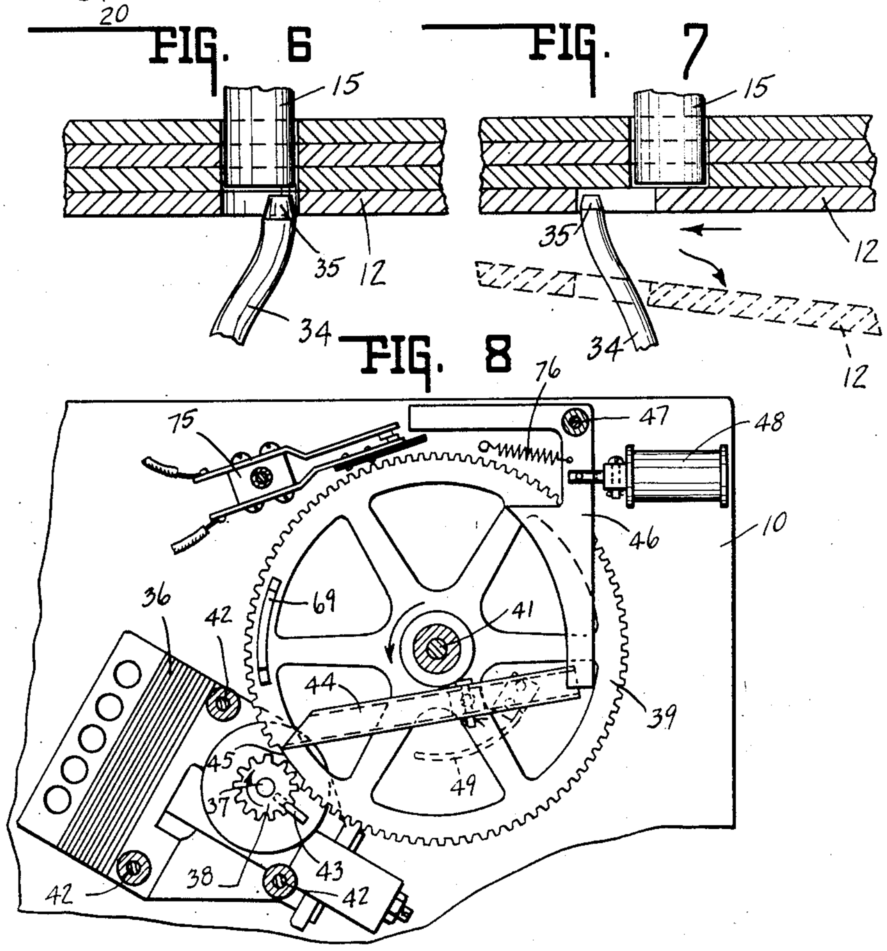
Figs. 6 and 7 are enlarged illustrative figures showing the various positions of the record when released.
Fig. 8 is a top plan view of portions of the actuating mechanism showing them in position during the playing of a record.

For driving the record changing mechanism, there is provided the usual electric motor 36 having a drive shaft 37 carrying a spur gear 38 adapted to mesh with a cam driving gear 39. Shaft 37 has a direct drive connection with the turntable and centering pin 33. At one point in the periphery of the cam gear 39 the teeth are removed, as shown in Fig. 8. Said cam gear 39 is formed about the periphery of the cam member 40 suspended upon a shaft 41 extending downwardly from the underside of the base plate 10. The motor 36 is similarly supported from the underside of the base plate 10 by the hangers 42.

The motor shaft 37 immediately above the gear 38 is provided with a radially-extending pin 43 adapted to engage a finger or coupling member 44 pivotally mounted on the hub portion of the gear 39, so that when in one position it will be engaged by pin 43 and when in another position it will be raised above said pin so as to be cleared. Said finger extends into position to be engaged by said pin adjacent that portion of the gear 39 indicated at 45 which is mutilated so as to have no interengagement with the gear 38. By means of this arrangement, and wherein the shaft 37 and pin 43 are continuously rotating with the gear 38, when the finger 44 is elevated about its pivotal mounting out of the path of the rotating pin 43, there will be no driving engagement between the spur gear and the cam gear. In this position the cam gear remains at rest so that the record changing mechanism will not be operated while a record is being reproduced through the rotation of the turntable driven by shaft 37.

Said finger 44 has its opposite end engaged by a bell crank lever 46 pivoted to the underside of the plate 10 at 47, which lever is actuated by a solenoid 48. With said bell crank lever 46 in normal position, the adjacent end of finger 44 is engaged thereunder so that the other end is held above the path of the pin 43, as illustrated in Figs. 8 and 9. Upon actuation of said solenoid by the trip mechanism, bell crank 46 will be withdrawn from finger 44, whereupon it will stop in a position to be struck by pin 43. When pin 43 strikes said finger, it partially rotates the cam gear 39 sufficient to cause its teeth to mesh with those of the gear 38. Thereupon the gear 39 and cam 40 will be rotated one revolution, during which rotation the finger 44 engages with a depending cam track 49 fixed to the underside of the base plate 10, as shown in Fig. 9. As it passes under said cam track 49, its opposite end is raised and in that position it leaves cam track 49, but is simultaneously engaged under bell crank lever 46 which continues to hold its raised end out of the path of pin 43 until the solenoid 48 again retracts the bell crank lever 46. With said finger 44 thus held out of the path of pin 43, and at that point the cam gear 39 being mutilated, it will come to rest during the next record playing operation.

By means of the above arrangement a simple mechanism is utilized for driving the cam 40 a single revolution upon energizing the solenoid 48 for actuating the record changing mechanism, said cam and mechanism automatically coming to rest upon the completion of the cycle for permitting free rotation of the turntable and reproduction of the record until the solenoid is again energized upon the record being completed.

From the above it will be noted that the cam 40 will be driven one revolution upon actuation of the solenoid 48 and upon completion of the single revolution will come to rest. The cam 40 acts to first elevate the tone arm 14 to lift the reproducer 13 from the record, swing the tone arm clear of the record, and then lower the record supporting plates 19*a*, 19*b* to cause the lowermost record to become engaged by the head 35 for releasing it to drop into playing position. Thereupon the reproducer is returned to overlie the start of the record and is lowered thereon. The cam then comes to rest to permit reproduction of the record in the usual way until the reproducer reaches the end of the record where it will cause the solenoid 48 to be energized for again initiating the cycle of movement of said cam.

The first action caused by the cam when it starts to revolve is effected by the cam surface 50 extending downwardly with which a roller 51 engages and over which it rides during the rotation thereof. The roller 51 is mounted on a lever 52 pivotally supported intermediate its ends at 53 by a depending ear extending downwardly from the base plate 10. The opposite end of the lever from the roller supports a tone arm raising pin 54 vertically slidable in a suitable guide on the base plate so that when elevated by the lever, it engages the underside of the tone arm 14 and raises it free of the record being reproduced. The tone arm is pivotally mounted for such movement at 55 on a standard 56 supported from the top of the base plate 10. The weight of the tone arm maintains the roller 51 in contact with the cam surface 50 and permits lowering of the reproducer into playing position when the cam allows the roller 51 to be raised under the tone arm weight.

The next movement is to swing the tone arm free of the record. For this purpose there is provided a bell crank lever 57 fulcrumed upon a stud 58 depending from the base plate 10. The free end of the lever engages an ear 59 secured to a shaft 60 extending vertically upwardly and rotatably supported within the standard 56, said shaft being secured at its upper end to the tone arm. The actuated end of the lever 57 is engaged by a cam surface 61 during rotation of the cam 40, forcing the engaged end of the lever outwardly and the engaging end of the lever inwardly against the ear 59 for rotating the shaft 60 to swing the reproducer away from the record. This movement swings the opposite end of the ear 59 against the free end of a pivoted arm 62 pivoted at 63 to the underside of the plate 10. Said arm is thereby moved against the tension of a spring 64 having one end connected to the arm and the other end anchored to a plate 65. Thus, the tone arm is swung outwardly by the action of the cam 61 and is swung inwardly by the spring 64 as the cam permits.

The tone arm may be adjusted to operate on either ten or twelve inch records by the manually operated knob 66 which may be turned within a bearing sleeve 67 and carries a shaft 68 at its lower end which is oblong in cross section. The arm 62 bears against shaft 68 so that it is positioned thereby to limit the inward swinging movement of the tone arm. Shaft 68 is so formed and positioned that when it is turned so that its narrow edge is engaged by arm 62, the tone arm of the reproducer will be swung back to position it for a twelve inch record. When the knob 66 is turned so as to present the broad side of said shaft 68 to the arm 62, the spring 64 will move said arm inwardly a slightly greater distance, which in turn will swing the reproducer inwardly to set it for a ten inch record.

After the tone arm has been thus swung clear of the record, a new record is released to drop into playing position on top of the turntable or reproduced record. As above described, the bottom record is released by lowering the plates 19*a*, 19*b* until the lower record is engaged by the head 35. This lowering movement is effected by the lever 31 engaging the cross bar 30 and forcing it downwardly. To do this, the opposite end of lever 31 is engaged and elevated by an upwardly-extending cam surface 69. Thus, after the cam member 40 is rotated sufficiently to cause the tone arm to be swung out of position, the cam surface 69 passes under the end of lever 31 to raise it and force the cross bar 30 downwardly to lower the records 12 and permit the lowermost record to be engaged by the head 35. Immediately upon such engagement, said lever is released so that the springs 29 return the supporting plates to normal position so that the remaining records will be supported free of the head 35.

For tripping the mechanism at the end of the record by energizing solenoid 48, there is provided a pair of contact members 70 and 71. When said members move into electric contact, they close the circuit through the solenoid 48. Member 70 is supported by an arm 72 secured to shaft 60 of the tone arm so as to swing therewith. The member 71 is mounted upon an arm 73 freely pivoted to swing in the same plane as arm 72. Arm 72 carries an adjustable plate 74 in position to engage arm 73. Said arm 73 normally extends between the plate 74 and the contact 70 of the arm 72 so as to be embraced therebetween, as well as normally spaced therefrom. The radial length of arm 73 with respect to its pivotal mounting is substantially less than that of arm 72, whereby the contact 71 will travel through an arc of less radius than contact 70. This arrangement causes them to move toward and away from each other in a substantially radial direction during the course of their swinging movement.

In Figs. 10 to 13, inclusive, the different positions of the contacts are illustrated. Looking upwardly from the underside, in Fig. 10, the arm 72 is shown swung away from the center of the turntable by the tone arm to its maximum outward position. The contact 70 is in engagement with the end of the insulated arm 73 and out of contact with contact 71. As the arm is moved inwardly during the playing of the record, as shown in Fig. 11, arm 73 is disengaged by contact 70, but is pushed by plate 74. As their relative swinging movement continues, contact 71 moves toward alignment with contact 70. Toward the end of the record, as shown in Fig. 12, the contacts are in alignment, but are still out of contact. However, if the needle runs into an eccentric groove, the swinging movement of arm 72 will be reversed so that contact 70 will be moved into engagement with contact 71 to energize the solenoid.

If the needle is operating in a spiral groove record, the arms move to the position illustrated in Fig. 13, where the plate 74 finally pushes contact 71 into engagement with contact 70, due to the extreme inward swinging of the tone arm by the spiral lead-in grooves. Thus, solenoid 48 will be energized through the reverse movement of the tone arm by an eccentric groove (Fig. 12), or by the extreme inward movement of the tone arm by a spiral groove (Fig. 13).

As shown in Fig. 14 an anti-chatter switch 75 is in series with contacts 70, 71. Said switch 75 is actuated by the short arm of bell crank lever 46 so that when said lever is in normal position for retaining the finger 44 out of the path of pin 43, said switch is closed so as to complete the circuit through the solenoid upon contact of the trip 70, 71. But immediately upon the solenoid being energized by the trip, switch 75 is opened by said bell crank lever so that the circuit will be broken and thereby prevent chattering of the solenoid while the tone arm is being swung outwardly. For this purpose the released end of finger 44 engages the inner curved edge of lever 46 to hold it against the tension of spring 76 and thereby hold switch 75 open until the lever is disengaged by the continued movement of the finger. Thereafter spring 76 returns the bell crank lever to normal position to again engage finger 44 when it rides under cam 49, as well as permit switch 75 to close so that the trip switch may again complete the circuit.

In parallel with the trip switch and anti-chatter switch there is a reject switch 77 in the form of a button, shown in Fig. 1. By closing switch 77 the solenoid will be actuated in the same manner as by the trip switch so as to initiate the record changing mechanism.

The motor 36 is in circuit with a hand-controlled snap switch 78 and also a hold-in switch 79 in parallel therewith. The hold-in switch is normally closed but is opened by the cam surface 80 when the cam member 40 reaches the position wherein the tone arm is swung to its outermost position. Thus, when it is desired to stop the machine and discontinue its operation, the switch 78 may be moved to off position so as to break the circuit therethrough. However, the circuit through the motor will continue to be closed by the normally closed hold-in switch 79 until the tone arm is swung to its outer position, whereupon cam 80 will open said switch and break the circuit to motor 36 until the motor switch 78 is again moved to "on" position.

The invention claimed is:

1. In an automatic phonograph having a record supporting turntable, a pivotally mounted pickup arm and a record changing mechanism, a continuously rotating shaft having a driving member coupled therewith, a change-cycle control cam wheel operatively associated with said mechanism and said member and having a mutilated portion to render said member ineffective to operate the cam wheel when presented thereto, a projection attached to said driving member, a finger pivoted on said cam wheel on a horizontal axis and normally tending to drop into position for engagement by said projection to effect driving engagement between said driving member and cam wheel, a latch operatively associated with said finger normally to engage and hold said finger out of the path of rotation of said projection during record reproduction, and means coupled to said pickup arm and movable thereby into engagement with said latch to move said latch free of said finger to permit said finger to move into engaging position with said projection.

2. In an automatic phonograph having a record supporting turntable, a pivotally mounted pickup arm and a record changing mechanism, a continuously rotating shaft, a pinion operatively associated with said shaft, a change-cycle control cam gear positioned relative to said pinion for meshing engagement therewith and operatively associated with said mechanism, said cam gear having a portion of its peripheral teeth removed for causing disengagement thereof with said pinion when said portion is presented thereto, a radially extending projection operatively associated with said pinion, and a member mounted on said cam gear for movement in a plane parallel to the axis of said gear into the path of rotation of said projection for engagement thereby, whereby a partial revolution will be imparted to said cam gear to effect meshing engagement with said pinion.

3. In an automatic phonograph having a record supporting turntable and a pivotally mounted pickup arm, a continuously rotating shaft, a pinion attached to said shaft, a change-cycle control cam gear positioned relative to said pinion for meshing engagement therewith, said cam gear having a portion of its peripheral teeth removed for causing disengagement thereof with said pinion when said portion is presented thereto, mechanism operatively associated with and actuated by said cam gear during one revolution thereof operable to place a record upon said turntable, a radially extending projection on said pinion, a member pivotally mounted on said cam gear and movable in a plane parallel to the axis of said gear into the path of rotation of said projection for engagement thereby, whereby a partial revolution will be imparted to said cam gear to effect meshing engagement with said pinion, and means operatively associated with said cam gear operable to return said member to its original position during the revolution thereof.

4. In an automatic phonograph having a record supporting turntable and a pivotally mounted pickup arm, a continuously rotating shaft, a driving member on said shaft, a change-cycle control cam wheel rotatably supported adjacent said member for peripheral driving engagement therewith, said wheel having a mutilated portion in its periphery for breaking said driving engagement when said portion is presented toward said driving member, a projection operatively associated with said driving member, a finger pivotally supported on said wheel adjacent said mutilated portion thereof for movement in a plane perpendicular to the plane of said gear into the path of rotation of said projection, whereby said finger may be engaged by said projection to impart partial rotation to said wheel for effecting driving engagement thereof with said driving member, and releasable means upon said wheel normally engaging said finger to withhold said finger from the path of rotation of said projection.

5. In a phonograph, the combination with a turntable and reproducer, of mechanism for automatically disengaging said reproducer from the record including a solenoid for initiating the actuation of said mechanism, an electric circuit therefor, a pair of associated arms pivoted to swing relative to each other about different arcs of different radii, one of said arms being connected with the reproducer to travel therewith and move the other arm, and a pair of contacts in said circuit mounted on said arms respectively to be brought into position for contacting by the relative movement of said arms as the reproducer moves inwardly toward the center of the record.

6. In a phonograph, the combination with a turntable and reproducer, of mechanism for automatically disengaging said reproducer from the record including a solenoid for initiating the actuation of said mechanism, an electric circuit therefor, an arm pivoted to swing with the reproducer and having a pocket on its free end provided with a contact connected in said circuit, a follower arm of shorter length pivoted to swing with said first-mentioned arm with its end extending freely into said pocket, and a contact adjacent to but spaced from the free end of said follower arm, said contact being connected in said circuit and movable to and away from a position for contacting with said first-mentioned contact as said arms are swung about their pivotal mountings.

7. In a phonograph, the combination with a turntable and reproducer, of mechanism for automatically disengaging said reproducer from the record including a solenoid for initiating the actuation of said mechanism, an electric circuit therefor, a pivoted arm connected with said reproducer to move therewith inwardly toward the center of a record, a follower arm pivoted to one side of said first-mentioned arm and of shorter length for causing the follower arm to move with said first-mentioned arm while permitting the limited relative movement therebetween, and a pair of contacts on said arms respectively and connected with said circuit, said contacts being so related as to move toward and away from each other in a radial direction with the swinging movement of said arms and whereby said contacts move radially into alignment for contacting engagement as the arms move inwardly toward the center of the record.

8. A trip mechanism for a phonograph having a tone arm, an electrically actuated solenoid for controlling said arm, and a pair of contacts in circuit with said solenoid for energizing it when closed, one of said contacts being mounted on a pivoted arm connected with the tone arm and the other contact on an associated arm pivotally spaced therefrom and of less length, said associated arm being in engagement with and moved by said connected arm, the difference in the arc of travel of the first-mentioned arm with respect to the second-mentioned arm upon the inward swing of the tone arm causing said contacts to be out of alignment when said arms are in ineffective position and moved into alignment for contact when the tone arm approaches the center of the record.

9. In a phonograph, the combination with a turntable and reproducer, of mechanism for automatically disengaging said reproducer from the record including a solenoid for initiating the actuation of said mechanism, an electric circuit therefor, a pair of associated arms pivoted to swing relative to each other in substantially parallel relation about different arcs of different radii, one of said arms being connected with the reproducer to travel therewith and the other arm being shorter and having its free end engageable thereby for swinging therewith when the reproducer moves outwardly of the record whereby said arms will be maintained in cooperative relation, a contact in said circuit carried by the longer arm, and a contact in said circuit on the shorter arm spaced from the free end thereof and from said first-mentioned contact when said arms are swung outwardly from the record and adapted to be moved into position for contacting engagement therewith when the arms approach the center of the record, said arms being free to oscillate relative to each other until their extreme inward position is reached.

10. In a trip mechanism for a record playing phonograph, the combination with a turntable for rotating a record having either eccentric or spiral terminating grooves, a tone arm carrying a reproducer adapted to follow said grooves, and electrically actuated mechanism for removing the reproducer from engagement with the record, of means for initiating the operation of said mechanism comprising a hooked arm pivotally mounted to move with said tone arm, a second and shorter arm pivotally mounted to one side of said hooked arm and having its free end extending into the hooked portion thereof, and electric contact members on the adjacent ends of said arms connected in an operating circuit with said mechanism, said arms and contact members being so positioned relative to each other as to be normally out of engagement during the reproduction of a record and brought into the effective engagement by a reverse action of the hooked arm when the reproducer enters an eccentric groove or by the extreme forward movement of said hooked arm when the reproducer enters into a spiral groove.

11. In a multiple phonograph having a turntable, a cooperating tone arm and a record changing mechanism, a continually rotating shaft, a driving member operatively associated therewith, said shaft having a projection, a cycle control member operatively associated with said driving member, a finger pivotally mounted on said cycle control member on a pivot normal to the axis of rotation of said cycle control member and having a portion movable into the path of movement of said projection, and means operatively connecting said pivoted finger and said tone arm for causing pivotal movement of said finger upon movement of said tone arm into the tripping groove of a record whereby to set in operation said cycle control member.

12. In a multiple record phonograph having a turntable, a cooperating tone arm and a record changing mechanism, a continually rotating shaft, a driving member operatively associated therewith, said shaft having a radial projection, a driven member operatively associated with said mechanism and said driving member, a finger pivotally mounted on said driven member on a pivot normal to the axis of rotation of said driven member and having an end portion movable into the path of movement of said projection, and means operatively connecting said pivoted finger and said tone arm for causing pivotal movement of said finger upon movement of said tone arm into the tripping groove of a record whereby to set in operation said driven member.

13. In a multiple record phonograph having a turntable, a cooperating tone arm and a record changing mechanism, a continually rotating shaft having a driving member attached thereto, said shaft having a radial projection, a driven member operatively associated with said mechanism and said driving member, a finger pivotally mounted on said driven member on a pivot normal to the axis of rotation of said driven member and having an end portion movable into the path of movement of said projection, and means operatively connecting said pivoted finger and said tone arm for causing pivotal movement of said finger upon movement of said tone arm to a certain position whereby to set in operation said driven member.

14. In a multiple record phonograph having a turntable, a cooperating tone arm and a record changing mechanism, a continually rotating shaft having a driving gear attached thereto, said driving gear having a radial projection, a driven gear operatively associated with said mechanism and said driving gear and having a mutilated portion, a finger pivotally mounted on said mutilated gear on a pivot normal to the axis of rotation of said mutilated gear and having an end portion movable into the path of movement of said projection, and means operatively connecting said pivoted finger and said tone arm for causing pivotal movement of said finger upon movement of said tone arm to a certain position whereby to set in operation said driven member.

15. In a phonographic apparatus having a movable record changer mechanism, a movable tone arm and a control mechanism operatively associated with the record changer and the tone arm, a mechanism to initiate the operation of said control mechanism comprising a rotatable member operatively associated with said control mechanism, peripheral driving means on the periphery of said rotatable member, a gap in the periphery of said peripheral driving means, a driving member operatively associated with said peripheral driving means to drive said rotatable member except when opposite said gap, an initiating member operatively associated with said driving member and another initiating member operatively associated with said first initiating member and mounted on said rotatable member for movement in a plane substantially parallel to the axis of said driving member, said initiating members being out of engagement with each other while a record is being reproduced but being engageable with each other momentarily to initiate the rotation of said rotatable member sufficiently to cause said driving member to engage said peripheral driving means on said rotatable member, and means operatively associated with said initiating members and said pickup arm to bring said initiating members into momentary engagement with each other to initiate a cycle of rotation of said rotatable member and thereby to drive the record changer mechanism and move the tone arm.

ANNA SMALL KOEHLINGER,
*Executrix of the Estate of Thomas W. Small, Deceased.*

REFERENCES CITED

The following references are of record in the file of this patent:

UNITED STATES PATENTS

| Number | Name | Date |
|---|---|---|
| 1,407,547 | Kellogg | Feb. 21, 1922 |
| 1,465,909 | Infante | Aug. 21, 1923 |
| 1,569,062 | Ziler | Jan. 12, 1926 |
| 1,991,005 | Whitman | Feb. 12, 1935 |

FOREIGN PATENTS

| Number | Country | Date |
|---|---|---|
| 522,610 | Germany | Apr. 16, 1931 |
| 383,341 | Great Britain | Nov. 17, 1932 |
| 403,758 | Great Britain | Jan. 4, 1934 |